US012646757B2

(12) United States Patent
Cheng et al.

(10) Patent No.: US 12,646,757 B2
(45) Date of Patent: Jun. 2, 2026

(54) FLOW TEST TOOL, NEGATIVE PRESSURE FORMATION APPARATUS, AND BATTERY MANUFACTURING DEVICE

(71) Applicant: CONTEMPORARY AMPEREX TECHNOLOGY (HONG KONG) LIMITED, Hong Kong (CN)

(72) Inventors: Shaosheng Cheng, Ningde (CN); Wen Yu, Ningde (CN); Jiefei Gong, Ningde (CN); Fengyu Guo, Ningde (CN); Yanqing Chen, Ningde (CN); Wei Wang, Ningde (CN); Weidong Song, Ningde (CN); Shaohui Zhang, Ningde (CN); Gege Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 333 days.

(21) Appl. No.: 18/472,257

(22) Filed: Sep. 22, 2023

(65) Prior Publication Data

US 2024/0154191 A1 May 9, 2024

Related U.S. Application Data

(63) Continuation of application No. PCT/CN2023/083050, filed on Mar. 22, 2023.

(30) Foreign Application Priority Data

Nov. 4, 2022 (CN) .......................... 202222988427.X

(51) Int. Cl.
H01M 10/42 (2006.01)
H01M 4/04 (2006.01)
(Continued)

(52) U.S. Cl.
CPC ..... H01M 10/4285 (2013.01); H01M 4/0447 (2013.01); H01M 10/4207 (2013.01);
(Continued)

(58) Field of Classification Search
CPC ........... H01M 10/4285; H01M 4/0447; H01M 10/4207; H01M 10/4235; H01M 50/35;
(Continued)

(56) References Cited

U.S. PATENT DOCUMENTS

2020/0411899 A1* 12/2020 Yu .......................... H01M 10/44

FOREIGN PATENT DOCUMENTS

CA      1101054 A      5/1981
CN      210995670 U  *  7/2020  ............... B08B 9/08
(Continued)

OTHER PUBLICATIONS

The international search report received in the corresponding international application PCT/CN2023/083050, mailed Aug. 2, 2023.
(Continued)

*Primary Examiner* — Benjamin R Schmitt
(74) *Attorney, Agent, or Firm* — K&L Gates LLP

(57) ABSTRACT

The present application provides a flow test tool, a negative pressure formation apparatus, and a battery manufacturing device. The flow test tool includes a base and a flow test module mounted on the base, the flow test module is provided with a plurality of test interfaces, and the test interface is connected to a fluid channel of a mechanism to be tested one by one.

20 Claims, 9 Drawing Sheets

(51) Int. Cl.
    *H01M 50/35*       (2021.01)
    *G01F 15/18*       (2006.01)

(52) U.S. Cl.
    CPC ....... *H01M 10/4235* (2013.01); *H01M 50/35*
               (2021.01); *G01F 15/18* (2013.01)

(58) Field of Classification Search
    CPC ........ G01F 15/18; G01F 15/185; G01M 3/26;
                              G01M 3/28
    See application file for complete search history.

(56) References Cited

FOREIGN PATENT DOCUMENTS

| | | | |
|---|---|---|---|
| CN | 217083775 | U | 7/2022 |
| CN | 217085115 | U | 7/2022 |
| CN | 217403525 | U | 9/2022 |
| EP | 4080662 | A1 | 10/2022 |
| WO | 2020258376 | A1 | 12/2020 |

OTHER PUBLICATIONS

The extended European search report received in the corresponding European application 23734441.1, mailed on Jul. 15, 2024.

\* cited by examiner

1121

11211

11212

1113

11131

11132

FLOW TEST TOOL, NEGATIVE PRESSURE FORMATION APPARATUS, AND BATTERY MANUFACTURING DEVICE

CROSS-REFERENCE

The present application is a continuation of International Application No. PCT/CN2023/083050, filed on Mar. 22, 2023, which claims priority to Chinese patent application No. 202222988427.X filed on Nov. 4, 2022 and entitled "FLOW TEST TOOL, NEGATIVE PRESSURE FORMATION APPARATUS, AND BATTERY MANUFACTURING DEVICE" which is incorporated herein by reference in its entirety.

TECHNICAL FIELD

The present application belongs to the technical field of flow testing, and more specifically relates to a flow test tool, a negative pressure formation apparatus, and a battery manufacturing device.

BACKGROUND

At present, in the manufacturing process of batteries, in order to improve the performance of the batteries, it is necessary to perform formation processing on the batteries. During formation processing on the batteries, gas will be generated inside the batteries, and the residual gas inside the batteries will seriously affect the performance of the batteries. Therefore, it is necessary to extract the gas inside the batteries during formation processing on the batteries.

In the actual manufacturing process, it is usually necessary to simultaneously extract gas from a plurality of batteries. Before the gas extracting operation, it is necessary to conduct a flow test on each gas extracting channel of a formation mechanism. However, due to the poor test accuracy of a traditional flow test method, it is difficult to accurately determine whether the gas extracting channel is blocked. When one or more gas extracting channels are blocked, it may lead to residual gas inside some batteries after completing the gas extracting operation, which is not conducive to improving the yield of the batteries.

SUMMARY OF THE INVENTION

Embodiments of the present application aim to provide a flow test tool, a negative pressure formation apparatus, and a battery manufacturing device to solve the technical problem of poor test accuracy of flow test methods in related technologies when conducting flow tests on a plurality of channels.

The technical solutions used in the embodiments of the present application are as follows:

According to the first aspect, an embodiment of the present application provides a flow test tool. The flow test tool includes a base and a flow test module mounted on the base, the flow test module is provided with a plurality of test interfaces, and the test interface is connected to a fluid channel of a mechanism to be tested one by one.

The flow test tool provided in the embodiment of the present application at least has the following beneficial effects: the flow test module of the flow test tool provided in the embodiment of the present application is provided with a plurality of test interfaces, and the test interface is connected to the fluid channel of the mechanism to be tested one by one, so that the flow test tool can conduct flow tests on each fluid channel of the mechanism to be tested at the same time. In the test process, the flow resistance of the fluid in each fluid channel is roughly the same to ensure that flow tests can be conducted on each fluid channel of the mechanism to be tested at the same time and in the same or similar test environment, thereby effectively improving the accuracy of flow tests on each fluid channel of the mechanism to be tested by the flow test tool.

In some embodiments of the present application, the flow test tool further includes adapter assemblies, the adapter assembly includes an adapter mounted on the base, the adapter is provided with a plurality of adapter channels, one open end of the adapter channel is connected to the test interface one by one, and the other open end of the adapter channel is connected to the fluid channel one by one.

By adopting the above technical solution, the test interface is connected to the adapter channel one by one, and then, the adapter channel is connected to the fluid channel one by one. Since the position of each adapter channel is relatively fixed, the test interface can be accurately and quickly connected to the fluid channel, so as to effectively improve the convenience of use of the flow test tool.

In some embodiments of the present application, the flow test tool further includes a plurality of connecting pipes, the adapter is provided with a first sleeve at the open end of the adapter channel close to the test interface, the flow test module is provided with a second sleeve at the test interface, one end of the connecting pipe is sleeved with the first sleeve, and the other end of the connecting pipe is sleeved with the second sleeve.

By adopting the above technical solution, it is convenient to realize the connection between the adapter and the flow test module.

In some embodiments of the present application, the adapter assembly further includes a plurality of sealing members, one end of the sealing member is in sealed connection with the open end of the adapter channel close to the fluid channel one by one, and the other end of the sealing member is in sealed connection with the open end of the fluid channel close to the adapter one by one.

By adopting the above technical solution, the gas tightness of connection between the adapter channel and the fluid channel is effectively improved, and the condition of fluid leakage in the communication area between the adapter channel and the fluid channel is effectively avoided, thereby further improving the accuracy of flow tests on each fluid channel of the mechanism to be tested by the flow test tool.

In some embodiments of the present application, the adapter is provided with a third sleeve at the open end of the adapter channel close to the fluid channel, and the sealing member has an annular structure and is sleeved with the third sleeve.

By adopting the above technical solution, it is convenient to realize the sealed connection between the sealing member and the adapter.

In some embodiments of the present application, the adapter is provided with a first annular groove at the outer peripheral edge of the open end of the adapter channel close to the fluid channel, and the sealing member has an annular structure and is inserted into the first annular groove.

By adopting the above technical solution, it is convenient to realize the sealed connection between the sealing member and the adapter.

In some embodiments of the present application, the sealing member abuts against the outer peripheral edge of the open end of the fluid channel close to the adapter.

By adopting the above technical solution, it is convenient to realize the sealed connection between the sealing member and the fluid channel of the mechanism to be tested.

In some embodiments of the present application, the base includes a first seat body and a first sliding rail arranged on the first seat body, the flow test module is mounted on the first seat body, and the adapter is slidably mounted on the first sliding rail.

By adopting the above technical solution, the position of the adapter can be adjusted according to the position of each fluid channel of the mechanism to be tested along the extension direction of the first sliding rail, and then, the flow test tool can be adapted to more types of mechanisms to be tested, thereby effectively improving the universality of the flow test tool.

In some embodiments of the present application, the base further includes a second sliding rail arranged on the first seat body, the flow test module is slidably mounted on the second sliding rail, and the second sliding rail and the first sliding rail are arranged in parallel.

By adopting the above technical solution, in the process of adjusting the position of the adapter, the flow test module can move synchronously with the adapter to ensure that the relative position between the flow test module and the adapter remains unchanged, so as to avoid the condition of failure of the connection between the test interface and the adapter channel caused by applying a larger pull force to the connecting portion between the test interface and the adapter channel, thereby effectively improving the use reliability of the flow test tool.

In some embodiments of the present application, the base further includes support rods, and the support rods are connected between the first seat body and the first sliding rail.

By adopting the above technical solution, the height of the flow test tool can be effectively increased, and then, the flow test tool can adapt to the driving strokes of driving mechanisms such as a lifting mechanism, so that a driving mechanism can be used to drive the flow test tool to move towards the direction of the mechanism to be tested to achieve the connection between the test interface and the fluid channel of the mechanism to be tested.

In some embodiments of the present application, the support rod is a telescopic rod.

By adopting the above technical solution, the height of the flow test tool can be adjusted according to the driving strokes of different driving mechanisms, and then, the flow test tool can work in cooperation with more types of driving mechanisms, thereby effectively improving the universality of the flow test tool.

In some embodiments of the present application, the flow test tool further includes a controller electrically connected to a host computer, and the flow test module is electrically connected to the controller.

By adopting the above technical solution, the flow data measured by the flow test module can be transmitted to the host computer in real time through the controller, so as to collect test data.

According to the second aspect, an embodiment of the present application provides a negative pressure formation apparatus. The negative pressure formation apparatus includes a formation mechanism and a flow test tool according to any one of the above embodiments, the formation mechanism is provided with a plurality of fluid channels, and the test interface is connected to the fluid channel one by one.

The negative pressure formation apparatus provided in the embodiment of the present application at least has the following beneficial effects: since the negative pressure formation apparatus provided in the embodiment of the present application uses the flow test tool according to any one of the above embodiments, before formation processing on batteries, the flow test tool can be used to conduct flow tests on each fluid channel of the formation mechanism. During the flow test, the flow resistance of the gas in each fluid channel is roughly the same to ensure that flow tests can be conducted on each fluid channel of the formation mechanism at the same time and in the same or similar test environment, thereby effectively improving the accuracy of flow tests on each fluid channel of the formation mechanism by the flow test tool.

In some embodiments of the present application, the negative pressure formation apparatus further includes a lifting mechanism, and the lifting mechanism is configured to drive the flow test tool to move towards the direction close to the formation mechanism, so as to enable the test interface to be connected to the fluid channel one by one.

By adopting the above technical solution, the automatic connection between the test interface of the flow test tool and the fluid channel of the formation mechanism can be realized, the manpower is saved, and the convenience of use of the negative pressure formation apparatus is effectively improved.

In some embodiments of the present application, the lifting mechanism includes a lifting seat and a driver, the base is arranged on the lifting seat, and the driver is configured to drive the lifting seat to move towards the direction close to the formation mechanism, so as to enable the test interface to be connected to the fluid channel one by one.

By adopting the above technical solution, the automatic connection between the test interface of the flow test tool and the fluid channel of the formation mechanism can be realized, the manpower is saved, and the convenience of use of the negative pressure formation apparatus is effectively improved.

In some embodiments of the present application, the lifting seat is provided with a first conductive element electrically connected to a power source, the base is provided with a second conductive element electrically connected to the flow test module, and the second conductive element is capable of abutting against the first conductive element after the base is placed on the lifting seat.

By adopting the above technical solution, after the base is placed on the lifting seat, the first conductive element abuts against the second conductive element, that is, the flow test tool can be electrified without the additional electrifying operation on the flow test tool, thereby further improving the convenience of use of the negative pressure formation apparatus.

In some embodiments of the present application, the first conductive element and/or the second conductive element are conductive leaf springs.

By adopting the above technical solution, it is effectively ensured that the first conductive element can be in close contact with the second conductive element.

In some embodiments of the present application, the lifting seat includes a second seat body and a positioning seat mounted on the second seat body, the second seat body is connected to the power output end of the driver, and the base is arranged on the positioning seat.

By adopting the above technical solution, the position of the flow test tool is effectively limited to prevent the displacement of the flow test tool during the movement of the flow test tool driven by the lifting mechanism, thereby ensuring that the flow test tool can be accurately connected to the formation mechanism.

In some embodiments of the present application, the base is provided with positioning holes, and the positioning seat is provided with positioning parts; or, the base is provided with positioning parts, and the positioning seat is provided with positioning holes; and the positioning parts are inserted into the positioning holes.

By adopting the above technical solution, under the cooperation between the positioning parts and the positioning holes, the position of the flow test tool is effectively limited to prevent the displacement of the flow test tool during the movement of the flow test tool driven by the lifting mechanism, thereby ensuring that the flow test tool can be accurately connected to the formation mechanism.

According to the third aspect, an embodiment of the present application provides a battery manufacturing device. The battery manufacturing device includes a negative pressure formation apparatus according to any one of the above embodiments.

The battery manufacturing device provided in the embodiment of the present application at least has the following beneficial effects: since the present application uses the negative pressure formation apparatus according to any one of the above embodiments, before formation processing on batteries, the flow test tool can be used to conduct flow tests on each fluid channel of the formation mechanism. During the flow test, the flow resistance of the gas in each fluid channel is roughly the same to ensure that flow tests can be conducted on each fluid channel of the formation mechanism at the same time and in the same or similar test environment, thereby effectively improving the accuracy of flow tests on each fluid channel of the formation mechanism by the flow test tool.

DESCRIPTION OF DRAWINGS

In order to more clearly illustrate the technical solutions in the embodiments of the present application, the drawings required for description in the embodiments or the prior art will be briefly described below. It is apparent that the drawings in the following description are only some embodiments of the present application. Those skilled in the art can also obtain other drawings according to these drawings without any creative work.

Figure 1:
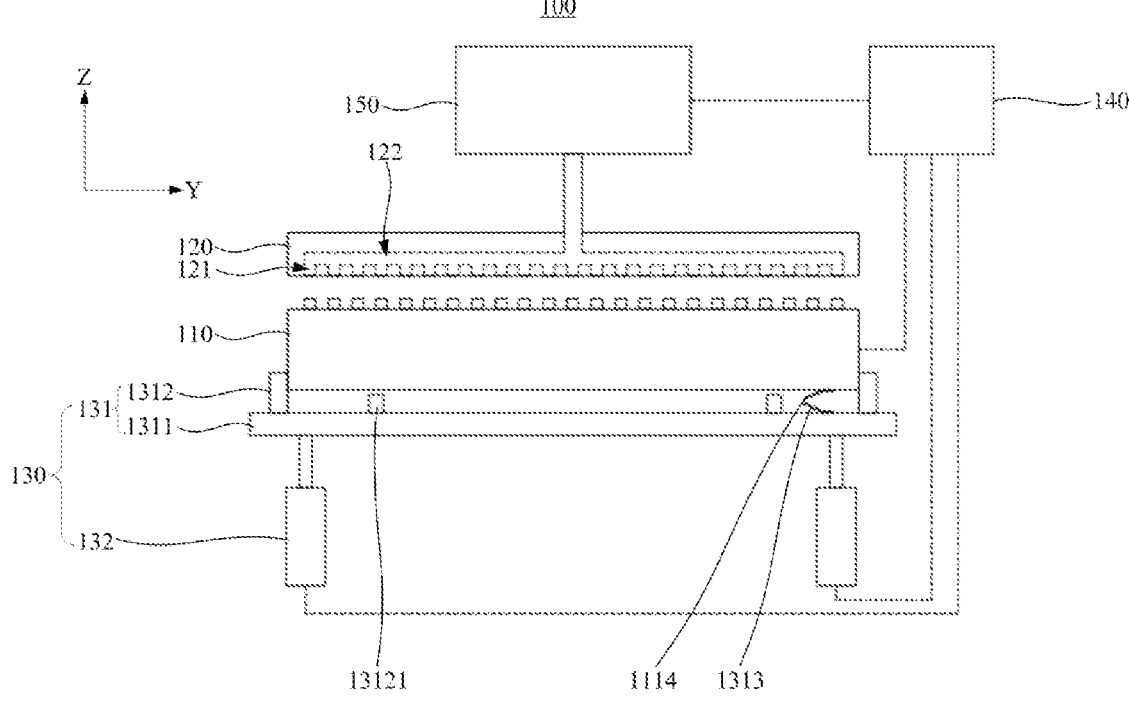
FIG. 1 is a schematic structural view of a negative pressure formation apparatus provided in an embodiment of the present application.

Here, the reference numerals in the drawings are as follows:

100. negative pressure formation apparatus;

110. flow test tool; 111. base; 1111. first seat body; 11111. positioning hole; 1112. first sliding rail; 11121. first guide groove; 1113. support rod; 11131. first rod segment; 11132. second rod segment; 1114. second conductive element; 112. flow test module; 1121. flow meter; 11211. second sleeve; 11212. suction port; 113. adapter assembly; 1131. adapter; 11311. adapter channel; 11312. first sleeve; 11313. third sleeve; 11314. first annular groove; 1132. sealing member; 114. connecting pipe; 115. controller;

120. formation mechanism; 121. fluid channel; 122. convergence channel;

130. lifting mechanism; 131. lifting seat; 1311. second seat body; 1312. positioning seat; 13121. positioning part; 1313. first conductive element; 132. driver;

140. host computer;

150. gas extracting mechanism.

DETAILED DESCRIPTION

In order to make the technical problems, technical solutions and beneficial effects to be solved in the present application clearer, the present application will be described in further detail below in conjunction with the drawings and embodiments. It should be understood that specific embodiments described herein are intended only to explain the present application, but not to limit the present application.

It should be noted that when an element is considered to be "fixed" or "arranged" on another element, the element may be directly or indirectly located on another element. When an element is considered to be "connected to" another element, the element may be directly or indirectly connected to another element.

It is to be understood that, the orientation or position relationships indicated by the terms "length", "width", "upper", "lower", "front", "rear", "left", "right", "vertical", "horizontal", "top", "bottom", "inner", "outer", and the like are based on the orientation or position relationships shown in the drawings and are only for facilitating the description of the present application and simplifying the description, rather than indicating or implying that the apparatus or element referred to must have a particular orientation or be constructed and operated in a particular orientation, and therefore will not be interpreted as limiting the present application.

In addition, the terms "first", "second", "third" and "fourth" are used for descriptive purposes only, and cannot be construed as indicating or implying relative importance or implicitly indicating the number of technical features indicated. Therefore, a feature defined by "first", "second", "third" or "fourth" may expressly or implicitly include one or more of the features. In the description of the present application, the meaning of "a plurality of" is two or more, unless otherwise explicitly and specifically defined.

In the manufacturing process of batteries, it is necessary to perform formation processing on the batteries. The formation processing refers to the process of charging the batteries for the first time to activate the batteries. During formation processing on the batteries, gas will be generated inside the batteries, and the residual gas inside the batteries may easily cause expansion and deformation of the batteries, resulting in adverse effects on the performance of the batteries. Therefore, it is necessary to extract the gas inside the batteries during formation processing on the batteries.

At present, in order to improve the production efficiency, it is usually necessary to perform formation processing on a plurality of batteries at the same time and extract gas from the plurality of batteries at the same time. Therefore, it is necessary to arrange a plurality of fluid channels for gases to flow through on the formation mechanism, and the fluid channels are communicated with the insides of the batteries one by one so as to extract the gas inside each battery. In order to ensure the same gas extracting speed for each battery, it is necessary to ensure that the gas flow in each fluid channel is the same. Therefore, before the gas extracting operation on the batteries, it is necessary to test the flow value of each fluid channel.

The flow test mode used currently is to insert a flow meter into any fluid channel and then start a gas extracting mechanism to form a negative pressure in each fluid channel, so as to measure the flow value of the fluid channel in which the flow meter is inserted, and then, the same mode is used to test the flow values of other fluid channels. However, since the flow resistance of the fluid channel in which the flow meter is inserted is greater than the fluid resistance of other fluid channels, after the gas extracting mechanism is started, the volume of the gas flowing into the fluid channel in which the flow meter is inserted will be less than the volume of the gas flowing into other fluid channels. As a result, the flow value of the fluid channel measured by the flow meter is less than the actual flow value of the fluid channel, so that the flow value of each fluid channel cannot be accurately measured, and whether the gas extracting channel is blocked cannot be accurately determined. When one or more gas extracting channels are blocked, it may lead to residual gas inside some batteries after completing the gas extracting operation, which is not conducive to improving the yield of the batteries.

In order to improve the accuracy of flow tests on each fluid channel, an embodiment of the present application provides a flow test tool. A flow test module of the flow test tool is provided with a plurality of test interfaces, and the test interface is connected to a fluid channel of a mechanism to be tested one by one, so that the flow test tool can conduct flow tests on each fluid channel of the mechanism to be tested at the same time. In the test process, the flow resistance of the gas in each fluid channel is roughly the same to ensure that flow tests can be conducted on each fluid channel of the mechanism to be tested at the same time and in the same or similar test environment, thereby effectively improving the accuracy of flow tests on each fluid channel of the mechanism to be tested by the flow test tool.

According to the first aspect, an embodiment of the present application provides a flow test tool 110. The flow test tool 110 can be used for a negative pressure formation apparatus, a negative pressure feeding apparatus, a water supply apparatus, an infusion apparatus and the like, and is configured to conduct flow tests on the fluid channels of the above apparatus, wherein fluids may be gases or liquids.

The flow test tool 110 provided in the embodiment of the present application is described below by taking the flow test tool 110 provided in the embodiment of the present application, which is used for a negative pressure formation apparatus, as an example with reference to the drawings.

Referring to FIG. 2 to FIG. 5, the flow test tool 110 includes a base 111 and flow test modules 112. The flow test modules 112 are mounted on the base 111, the flow test module 112 is provided with a plurality of test interfaces, and the test interface is connected to a fluid channel 121 of a mechanism to be tested one by one.

The base 111 refers to a component for providing mounting space for the flow test module 112 and other components of the flow test tool 110. The base 111 may be an integrally formed structural member, and the structural member may be in the form of a platy structure, a columnar structure, or the like, which is not specifically limited herein. Of course, in other embodiments, the base 111 may also be an assembly formed by assembling a plurality of components. The base 111 is made of a rigid material, and the rigid material includes, but is not limited to, aluminum, copper, iron, steel, plastic, or the like, which is not specifically limited herein.

The flow test module 112 refers to a component for obtaining the flow value of the fluid channel 121. The test interface of the flow test module 112 may be a gas outlet of the flow test module 112, that is, the gas flows out of the flow test module 112 through the test interface. The test interface of the flow test module 112 may also be a gas inlet of the flow test module 112, that is, the gas flows into the flow test module 112 through the test interface.

The following takes an example in which the test interface of the flow test module 112 is a gas outlet of the flow test module 112 for description.

The flow test module 112 is further provided with a suction port 11212 communicated with the test interface, and the gas enters the flow test module 112 from the suction port 11212 and then flows out of a flow meter 1121 through the test interface. The flow test module 112 may be a separate component or an integrated component. When the flow test module 112 is a separate component, the flow test module 112 may include a plurality of flow meters 1121. The flow meter 1121 is provided with a test interface and a suction port 11212. During a flow test, the gas enters the flow meter 1121 from the suction port 11212 and then flows out of the flow meter 1121 through the test interface, so as to obtain the flow value of the gas flow. When the flow test module 112 is an integrated component, the flow test module 112 may be provided with a plurality of test interfaces, a plurality of suction ports 11212 and a plurality of test channels. The suction port 11212, the test interface and the test channel are communicated one by one. During a flow test, the gas enters the test channel from the suction port 11212 and then flows out of the flow meter 1121 through the test interface, so as to obtain the flow value of the gas flow.

Figure 2:
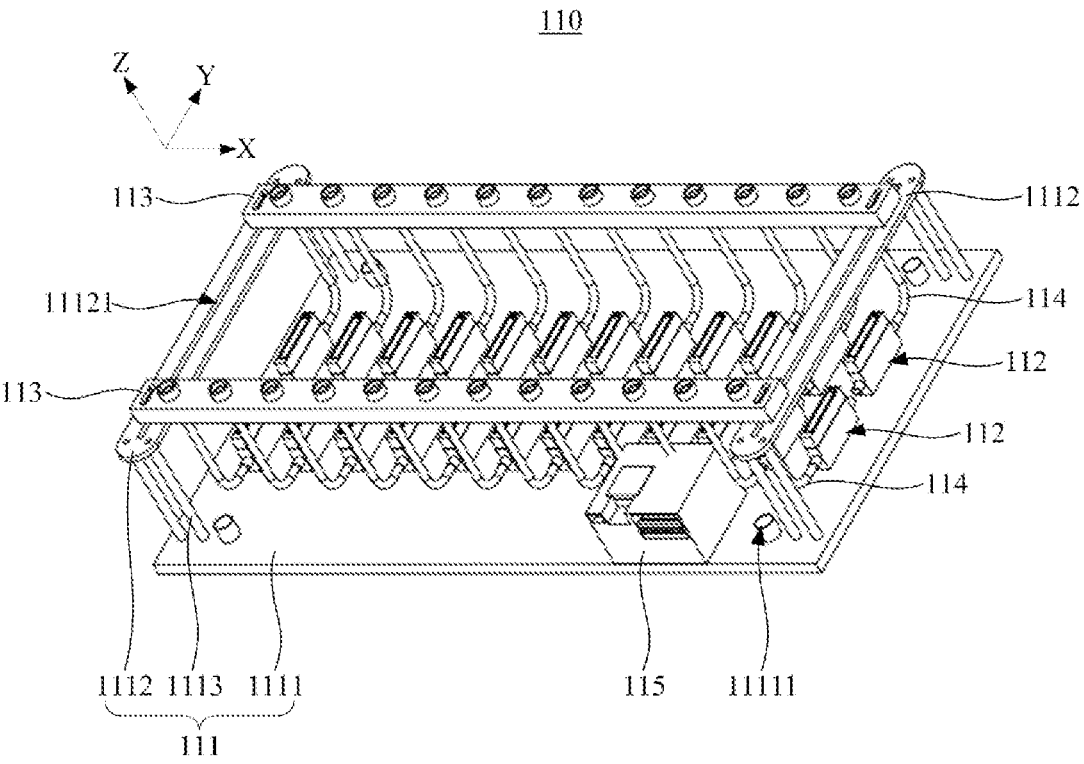
FIG. 2 is a schematic structural view of a flow test tool provided in an embodiment of the present application.

For the convenience of description, the X direction shown in FIG. 2 is the length direction of the flow test tool 110, the Y direction shown in FIG. 2 is the width direction of the flow test tool 110, and the Z direction shown in FIG. 2 is the height direction of the flow test tool 110.

The distribution structure of each test interface of the flow test module 112 may be determined according to the distribution structure of the port of each fluid channel 121 of the mechanism to be tested. For example, each test interface of the flow test module 112 may be sequentially distributed along the length direction of the flow test tool 110. For another example, each test interface of the flow test module 112 may be sequentially distributed along the width direction of the flow test tool 110. One or a plurality of flow test modules 112 may be provided, for example, two or three flow test modules 112 may be provided. When a plurality of flow test modules 112 are provided, the distribution structure of each flow test module 112 may be determined according to the distribution structure of the port of each fluid channel 121 of the mechanism to be tested. For example, a plurality of flow test modules 112 may be sequentially distributed along the length direction of the flow test tool 110. For another example, a plurality of flow test modules 112 may be sequentially distributed along the width direction of the flow test tool 110.

In this embodiment, a plurality of flow test modules 112 are provided, the plurality of flow test modules 112 are sequentially distributed along the width direction of the flow test tool 110, and each test interface of the flow test module 112 is sequentially distributed along the length direction of the flow test tool 110.

The one-to-one connection between the test interface and the fluid channel 121 of the mechanism to be tested refers to the one-to-one correspondence and intercommunication between each test interface and each fluid channel 121. The gas can enter the corresponding fluid channel 121 through the test interface.

The flow test module 112 of the flow test tool 110 provided in the embodiment of the present application is provided with a plurality of test interfaces, and the test interface is connected to the fluid channel 121 of the mechanism to be tested one by one, so that the flow test tool 110 can conduct flow tests on each fluid channel 121 of the mechanism to be tested at the same time. In the test process, the flow resistance of the fluid in each fluid channel 121 is roughly the same to ensure that flow tests can be conducted on each fluid channel 121 of the mechanism to be tested at the same time and in the same or similar test environment, thereby effectively improving the accuracy of flow tests on each fluid channel 121 of the mechanism to be tested by the flow test tool 110.

In some embodiments of the present application, referring to FIG. 2 and FIG. 6 to FIG. 9, the flow test tool 110 further includes adapter assemblies 113, the adapter assembly 113 includes an adapter 1131, the adapter 1131 is mounted on the base 111 and is provided with a plurality of adapter channels 11311, one open end of the adapter channel 11311 is connected to the test interface one by one, and the other open end of the adapter channel 11311 is connected to the fluid channel 121 one by one.

The adapter 1131 refers to a component arranged between the test interface and the fluid channel 121 and used as a communication medium between the test interface and the fluid channel 121. The adapter 1131 has various structures, such as a platy structure and a rod-shaped structure, which are not specifically limited herein. The adapter 1131 may be made of a rigid material, and the rigid material includes, but is not limited to, aluminum, copper, iron, steel, plastic, or the like, which is not specifically limited herein.

Figure 6:
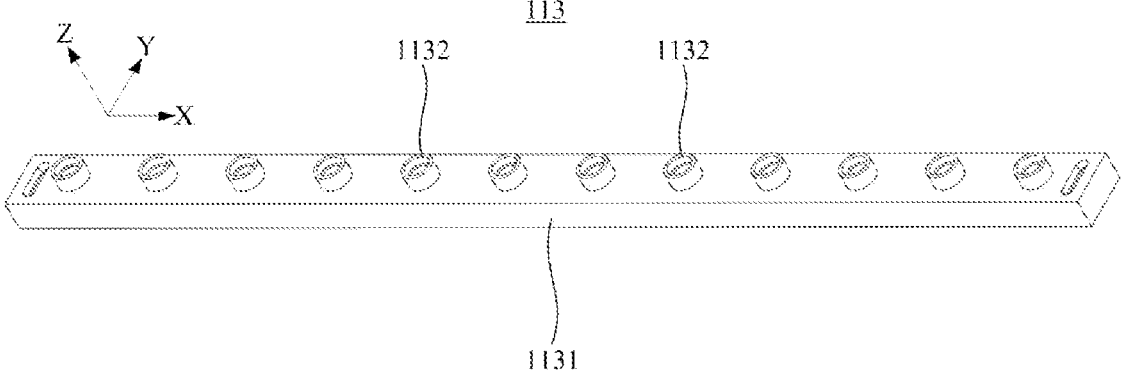
FIG. 6 is a schematic structural view of an adapter assembly in a flow test tool shown in FIG. 2.

For the convenience of description, the X direction shown in FIG. 6 is the length direction of the adapter 1131, the Y direction shown in FIG. 6 is the width direction of the adapter 1131, and the Z direction shown in FIG. 6 is the thickness direction of the adapter 1131.

The adapter channel 11311 is a transfer channel for communicating the test interface with the fluid channel 121. Each adapter channel 11311 is sequentially distributed along the length direction of the adapter 1131. The adapter channel 11311 penetrates through the adapter 1131 to form two open ends. Optionally, the adapter channel 11311 may penetrate through the adapter 1131 along the thickness direction of the adapter 1131, that is, two open ends of the adapter channel 11311 are respectively arranged on two opposite sides of the adapter 1131 along the thickness direction of the adapter 1131; or the adapter channel 11311 may also penetrate through the adapter 1131 along the width direction of the adapter 1131, that is, two open ends of the adapter channel 11311 are respectively arranged on two opposite sides of the adapter 1131 along the width direction of the adapter 1131. When the adapter channel 11311 penetrates through the adapter 1131 along the thickness direction of the adapter 1131, in order to facilitate the connection of the test interface and the fluid channel 121 with the adapter channel 11311 respectively, the flow test module 112 and the mechanism to be tested are respectively arranged on two opposite sides of the adapter 1131 along the thickness direction of the adapter 1131. When the adapter channel 11311 penetrates through the adapter 1131 along the width direction of the adapter 1131, in order to facilitate the connection of the test interface and the fluid channel 121 with the adapter channel 11311 respectively, the flow test module 112 and the mechanism to be tested are respectively arranged on two opposite sides of the adapter 1131 along the width direction of the adapter 1131.

The one-to-one connection between one open end of the adapter channel 11311 and the test interface refers to the one-to-one correspondence and intercommunication between one open end of each adapter channel 11311 and each test interface. The test interface may be directly connected to the adapter channel 11311 to achieve intercommunication, or the test interface may also be indirectly connected to the adapter channel 11311 to achieve intercommunication. For example, the flow test tool 110 further includes a plurality of connecting pipes 114, one end of the connecting pipe 114 is connected to the test interface, and the other end of the connecting pipe 114 is connected to one open end of the adapter channel 11311, thereby achieving intercommunication between the test interface and the adapter channel 11311. Referring to FIG. 2, FIG. 4, FIG. 5 and FIG. 8, when the test interface is connected to the adapter channel 11311 through the connecting pipe 114, the adapter 1131 is provided with a first sleeve 11312 at the open end of the adapter channel 11311 close to the test interface, that is, the open end of the adapter channel 11311 close to the test interface is located in the first sleeve 11312; the flow test module 112 is provided with a second sleeve 11211 at the test interface, that is, the test interface is located in the second sleeve 11211; and one end of the connecting pipe 114 is sleeved with the first sleeve 11312, and the other end of the connecting pipe 114 is sleeved with the second sleeve 11211, thereby achieving intercommunication between the test interface and the adapter channel 11311.

The one-to-one connection between the other open end of the adapter channel 11311 and the fluid channel 121 refers to the one-to-one correspondence and intercommunication between the other open end of each adapter channel 11311 and each test interface. The gas can sequentially flow through the test interface, one open end of the adapter channel 11311 and the other open end of the adapter channel 11311 to enter the corresponding fluid channel 121.

By adopting the above technical solution, the test interface is connected to the adapter channel 11311 one by one, and then, the adapter channel 11311 is connected to the fluid channel 121 one by one. Since the position of each adapter channel 11311 is relatively fixed, the test interface can be accurately and quickly connected to the fluid channel 121, so as to effectively improve the convenience of use of the flow test tool 110.

Figure 7:
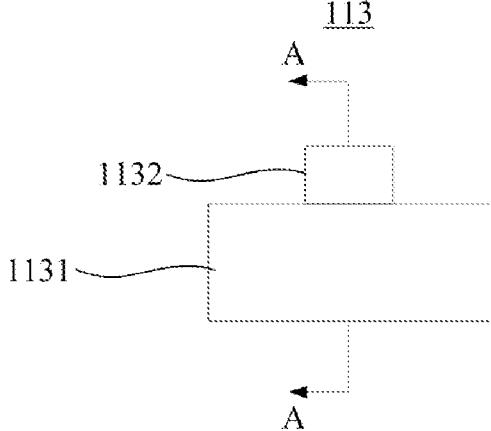
FIG. 7 is a schematic view of a right view structure of an adapter assembly shown in FIG. 6.
Figure 8:
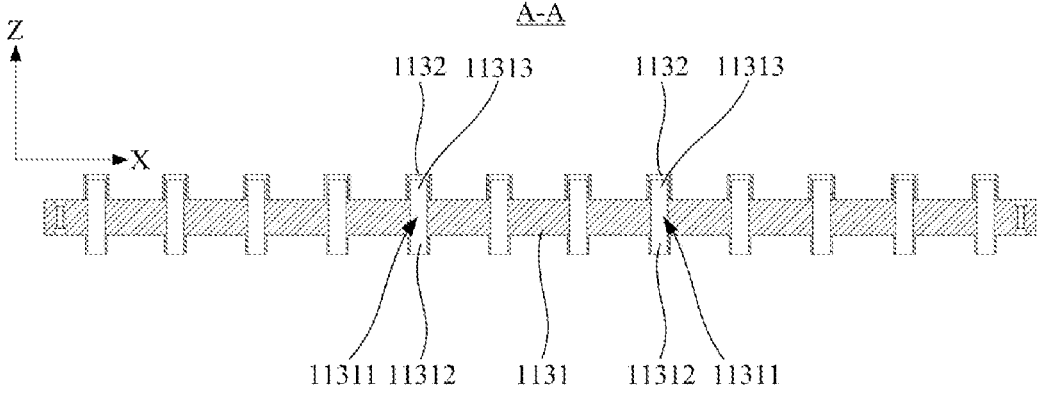
FIG. 8 is a schematic view I of a cross-sectional structure of an adapter assembly shown in FIG. 7 taken along a line A-A.
Figure 9:
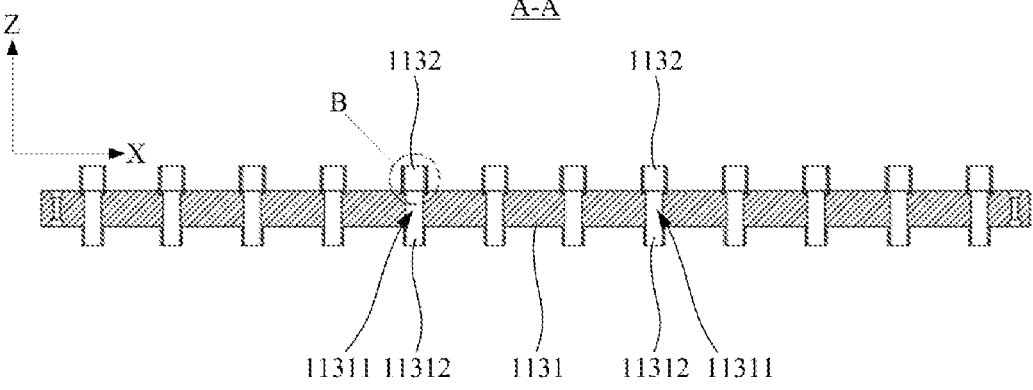
FIG. 9 is a schematic view II of a cross-sectional structure of an adapter assembly shown in FIG. 7 taken along a line A-A.

In some embodiments of the present application, referring to FIG. 6 to FIG. 8, the adapter assembly 113 further includes a plurality of sealing members 1132, one end of the sealing member 1132 is in sealed connection with the open end of the adapter channel 11311 close to the fluid channel 121 one by one, and the other end of the sealing member 1132 is in sealed connection with the open end of the fluid channel 121 close to the adapter 1131 one by one.

The sealing member 1132 refers to a component for isolating the communication area between the adapter channel 11311 and the fluid channel 121 from the external environment. The sealing member 1132 has an annular structure, that is, the middle of the sealing member 1132 is provided with a cavity for gases to flow through, and the cavity penetrates through two end surfaces of the sealing member 1132 to form two cavity openings. The gas can enter the cavity of the sealing member 1132 through one cavity opening of the sealing member 1132 from the adapter channel 11311, and then enter the flow channel through another cavity opening of the sealing member 1132. The sealing member 1132 is made of a flexible material, and the flexible material includes, but is not limited to, rubber, silicone, or the like, which is not specifically limited herein.

Figure 10:
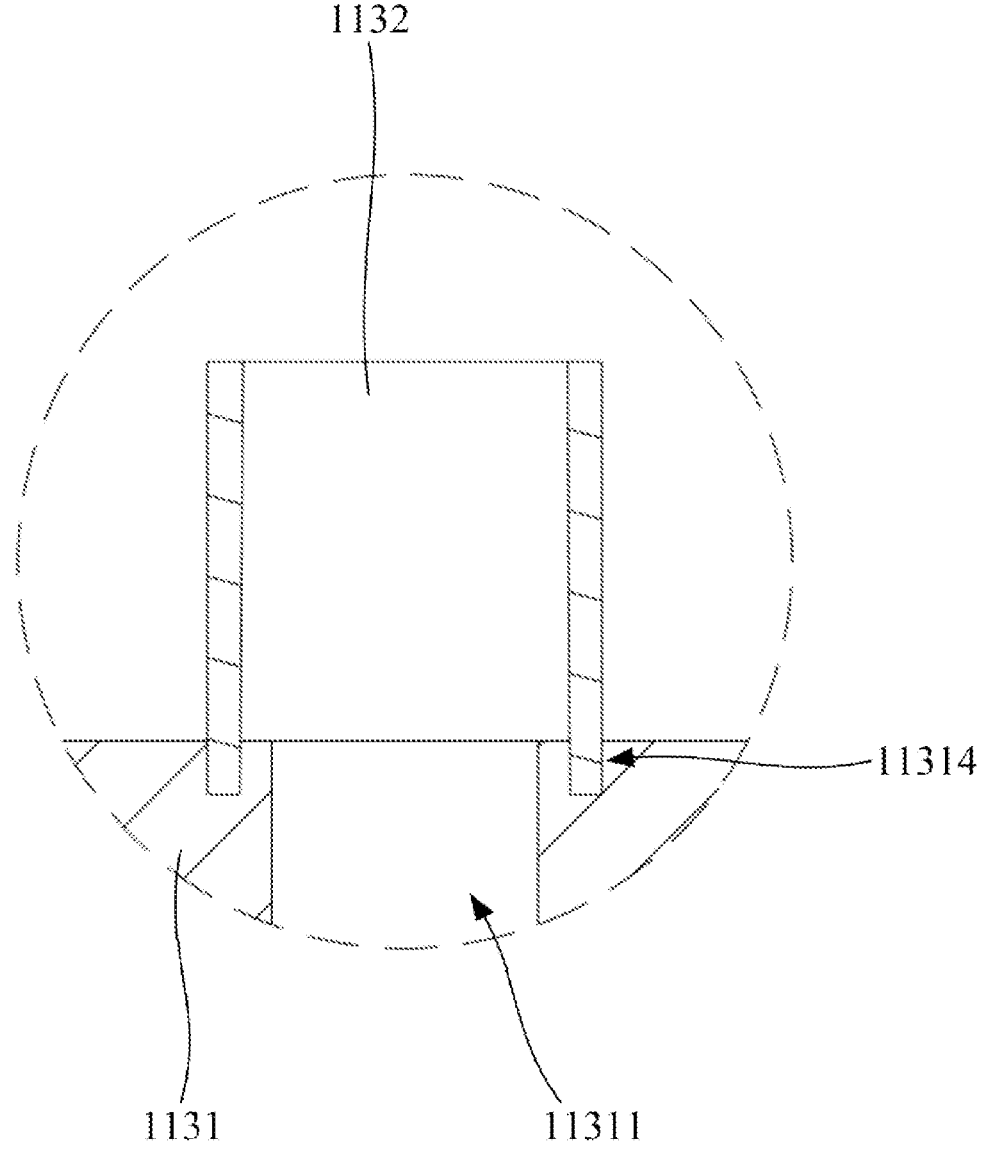
FIG. 10 is a schematic view of an enlarged structure of a part B of an adapter assembly shown in FIG. 9.

There are multiple modes of sealed connection between the sealing member 1132 and the open end of the adapter channel 11311 close to the fluid channel 121. For example, referring to FIG. 8, the adapter 1131 is provided with a third sleeve 11313 at the open end of the adapter channel 11311 close to the fluid channel 121, that is, the open end of the adapter channel 11311 close to the fluid channel 121 is located in the third sleeve 11313, and the sealing member 1132 is sleeved with the third sleeve 11313. For another example, referring to FIG. 9 and FIG. 10, the adapter 1131 is provided with a first annular groove 11314 at the outer peripheral edge of the open end of the adapter channel 11311 close to the fluid channel 121, that is, the open end of the adapter channel 11311 close to the fluid channel 121 is located in the inner annular space of the first annular groove 11314, and the sealing member 1132 is inserted into the first annular groove 11314.

There are multiple modes of sealed connection between the sealing member 1132 and the open end of the fluid channel 121 close to the adapter 1131. For example, the sealing member 1132 abuts against the outer peripheral edge of the open end of the fluid channel 121 close to the adapter 1131 to enable the sealing member 1132 to encircle the open end of the fluid channel 121 close to the adapter 1131. For another example, the mechanism to be tested is provided with a fourth sleeve at the open end of the fluid channel 121 close to the adapter 1131, that is, the open end of the fluid channel 121 close to the adapter 1131 is located in the fourth sleeve, and the sealing member 1132 is sleeved with the fourth sleeve. For another example, the mechanism to be tested is provided with a second annular groove at the outer peripheral edge of the open end of the fluid channel 121 close to the adapter 1131, that is, the open end of the fluid channel 121 close to the adapter 1131 is located in the inner annular space of the second annular groove, and the sealing member 1132 is inserted into the second annular groove.

By adopting the above technical solution, the gas tightness of connection between the adapter channel 11311 and the fluid channel 121 is effectively improved, and the condition of fluid leakage in the communication area between the adapter channel 11311 and the fluid channel 121 is effectively avoided, thereby further improving the accuracy of flow tests on each fluid channel 121 of the mechanism to be tested by the flow test tool 110.

Figure 3:
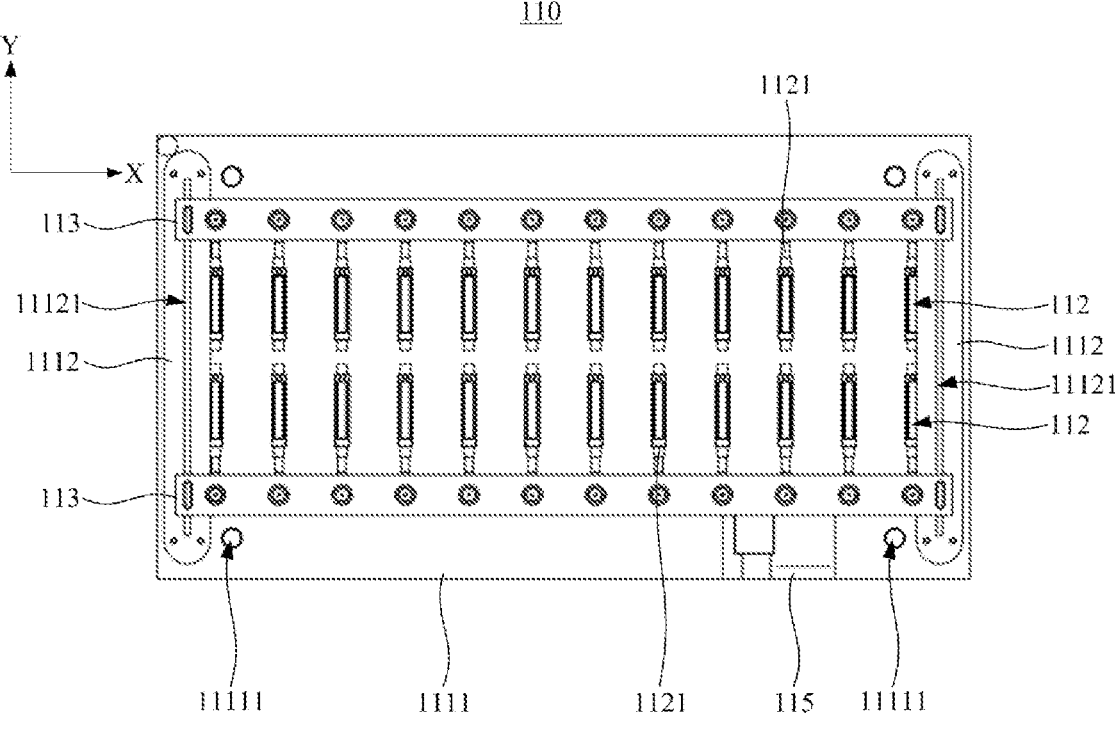
FIG. 3 is a schematic view of a top view structure of a flow test tool shown in FIG. 2.
Figure 4:
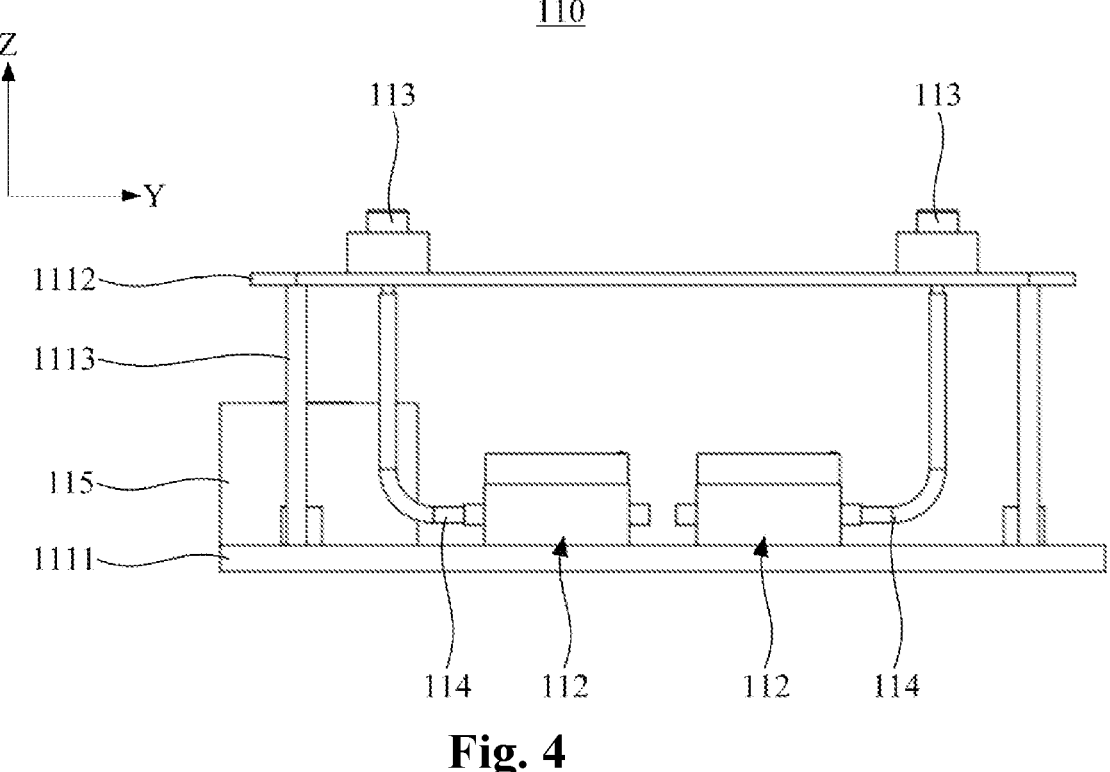
FIG. 4 is a schematic view of a right view structure of a flow test tool shown in FIG. 2.
Figure 5:
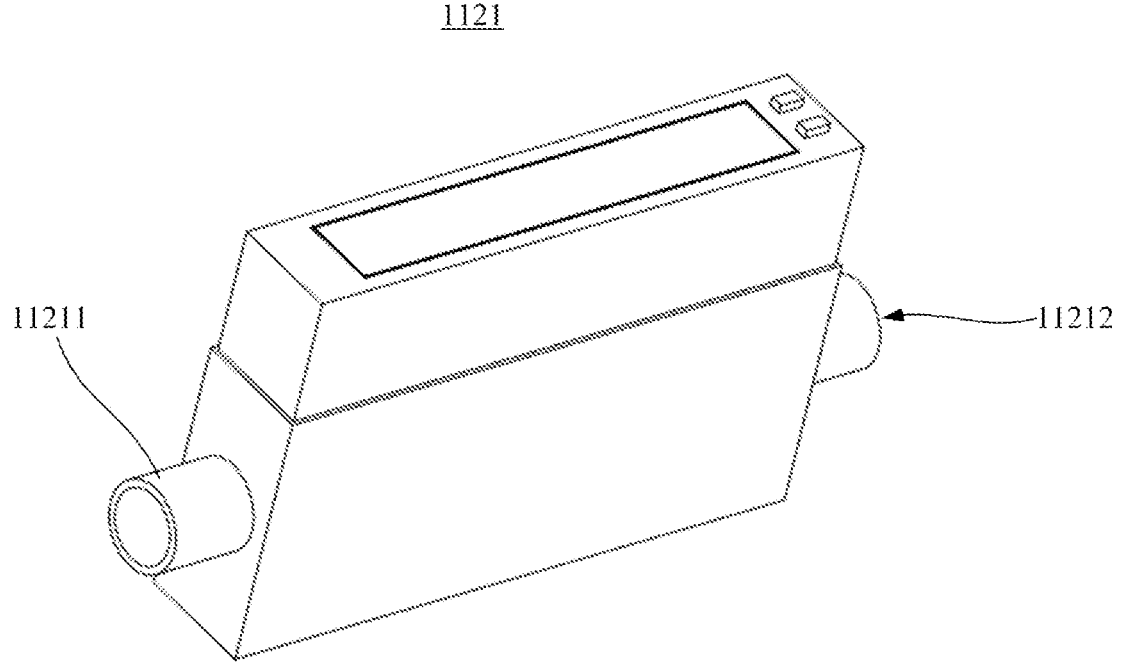
FIG. 5 is a schematic structural view of a flow meter of a flow test module in a flow test tool shown in FIG. 2.

In some embodiments of the present application, referring to FIG. 2 to FIG. 4, the base 111 includes a first seat body 1111 and a first sliding rail 1112, the first sliding rail 1112 is arranged on the first seat body 1111, the flow test module 112 is mounted on the first seat body 1111, and the adapter 1131 is slidably mounted on the first sliding rail 1112.

The first seat body 1111 refers to a main support component of the base 111, and the first seat body 1111 is configured to provide mounting space for components such as the flow test module 112 and the first sliding rail 1112. The first seat body 1111 is made of a rigid material, and the rigid material includes, but is not limited to, aluminum, copper, iron, steel, plastic, or the like, which is not specifically limited herein.

The first sliding rail 1112 can extend along the width direction of the flow test tool 110, and can also extend along the length direction of the flow test tool 110. In other words, the adapter 1131 can slide along the width direction of the flow test tool 110, and can also slide along the length direction of the flow test tool 110. The number of first sliding rails 1112 can be determined according to actual design needs. For example, two or three first sliding rails 1112 may be provided. In this embodiment, two first sliding rails 1112 are provided, and the two first sliding rails 1112 are respectively arranged on two opposite sides of the first seat body 1111. For example, when the first sliding rail 1112 can extend along the width direction of the flow test tool 110, the two first sliding rails 1112 are respectively arranged on two opposite sides of the first seat body 1111 along the length direction of the first seat body 1111, and the adapter 1131 is slidably connected between the two first sliding rails 1112.

There are multiple structural forms of the first sliding rail 1112. In some embodiments, referring to FIG. 2 and FIG. 3, the first sliding rail 1112 has a platy structure, the first sliding rail 1112 is provided with a first guide groove 11121, and the adapter 1131 is slidably connected to the first guide groove 11121. Specifically, the adapter 1131 may be slidably connected to the first guide groove 11121 through a fastener such as a bolt or a screw. When the adapter 1131 moves to a preset position along the first guide groove 11121, the position of the adapter 1131 can be locked by tightening the fastener.

In other embodiments, the first sliding rail 1112 has a strip structure, the adapter 1131 is provided with a first sliding block, the first sliding block is provided with a first sliding groove, and the first sliding block is in sliding fit with the first sliding rail 1112 through the first sliding groove. Specifically, the adapter 1131 further includes a fastener which may be a bolt, a screw, or the like. The first sliding block is provided with a threaded hole, the threaded hole penetrates to the first sliding groove from the outer wall of the first sliding block, and the fastener is connected to the threaded hole. When the adapter 1131 moves to a preset position along the first sliding rail 1112, the fastener can be screwed to enable the fastener to pass through the threaded hole and be pressed against the first sliding rail 1112, so as to lock the position of the adapter 1131.

By adopting the above technical solution, the position of the adapter 1131 can be adjusted according to the position of each fluid channel 121 of the mechanism to be tested along the extension direction of the first sliding rail 1112, and then, the flow test tool 110 can be adapted to more types of mechanisms to be tested, thereby effectively improving the universality of the flow test tool 110.

In some embodiments of the present application, the base 111 further includes a second sliding rail arranged on the first seat body 1111, the flow test module 112 is slidably mounted on the second sliding rail, and the second sliding rail and the first sliding rail 1112 are arranged in parallel.

When the flow test module 112 includes a plurality of flow meters 1121, the number of second sliding rails is the same as the number of flow meters 1121, and the flow meter 1121 is in sliding fit with the second sliding rail one by one. When the flow test module 112 is an integrated component, the number of second sliding rails can be determined according to actual design needs. For example, two second sliding rails are provided, and two opposite sides of the flow test module 112 are in sliding fit with the two second sliding rails one by one.

There are multiple structural forms of the second sliding rail. In some embodiments, the second sliding rail has a platy structure, the second sliding rail is provided with a second guide groove, and the flow test module 112 is slidably connected to the second guide groove.

In other embodiments, the second sliding rail has a strip structure, the flow test module 112 is provided with a second sliding block, the second sliding block is provided with a second sliding groove, and the second sliding block is in sliding fit with the second sliding rail through the second sliding groove.

By adopting the above technical solution, in the process of adjusting the position of the adapter 1131, the flow test module 112 can move synchronously with the adapter 1131 to ensure that the relative position between the flow test module 112 and the adapter 1131 remains unchanged, so as to avoid the condition of failure of the connection between the test interface and the adapter channel 11311 caused by applying a larger pull force to the connecting portion between the test interface and the adapter channel 11311, thereby effectively improving the use reliability of the flow test tool 110.

In some embodiments of the present application, referring to FIG. 2 and FIG. 4, the base 111 further includes support rods 1113, and the support rods 1113 are connected between the first seat body 1111 and the first sliding rail 1112.

The support rod 1113 is a connecting component between the first seat body 1111 and the first sliding rail 1112, which plays a role in supporting the first sliding rail 1112. The support rod 1113 extends along the height direction of the flow test tool 110. One end of the support rod 1113 is connected to the first seat body 1111. There are multiple modes of connection between the support rod 1113 and the first seat body 1111, such as fastening connection, welding and bonding, which are not specifically limited herein. The other end of the support rod 1113 is connected to the first sliding rail 1112. There are multiple modes of connection between the support rod 1113 and the first sliding rail 1112, such as fastening connection, welding and bonding, which are not specifically limited herein. A plurality of support rods 1113 may be provided. In order to ensure the mounting stability of the first sliding rail 1112, at least one support rod 1113 is connected to both ends of the first sliding rail 1112. The support rod 1113 is made of a rigid material, and the rigid material includes, but is not limited to, aluminum, copper, iron, steel, plastic, or the like, which is not specifically limited herein.

Since the flow test tool 110 needs to be connected to a formation mechanism 120, the volume and weight of the flow test tool 110 are relatively large. Therefore, it is usually necessary to use a lifting mechanism 130 to lift the flow test tool 110 to achieve the connection between the flow test tool 110 and the formation mechanism 120. By adopting the above technical solution, the height of the flow test tool 110 can be effectively increased, and then, the flow test tool 110 can adapt to the driving strokes of driving mechanisms such as the lifting mechanism 130, so that a driving mechanism can be used to drive the flow test tool 110 to move towards the direction of the mechanism to be tested to achieve the connection between the test interface and the fluid channel 121 of the mechanism to be tested.

In some embodiments of the present application, the support rod 1113 is a telescopic rod.

Figure 11:
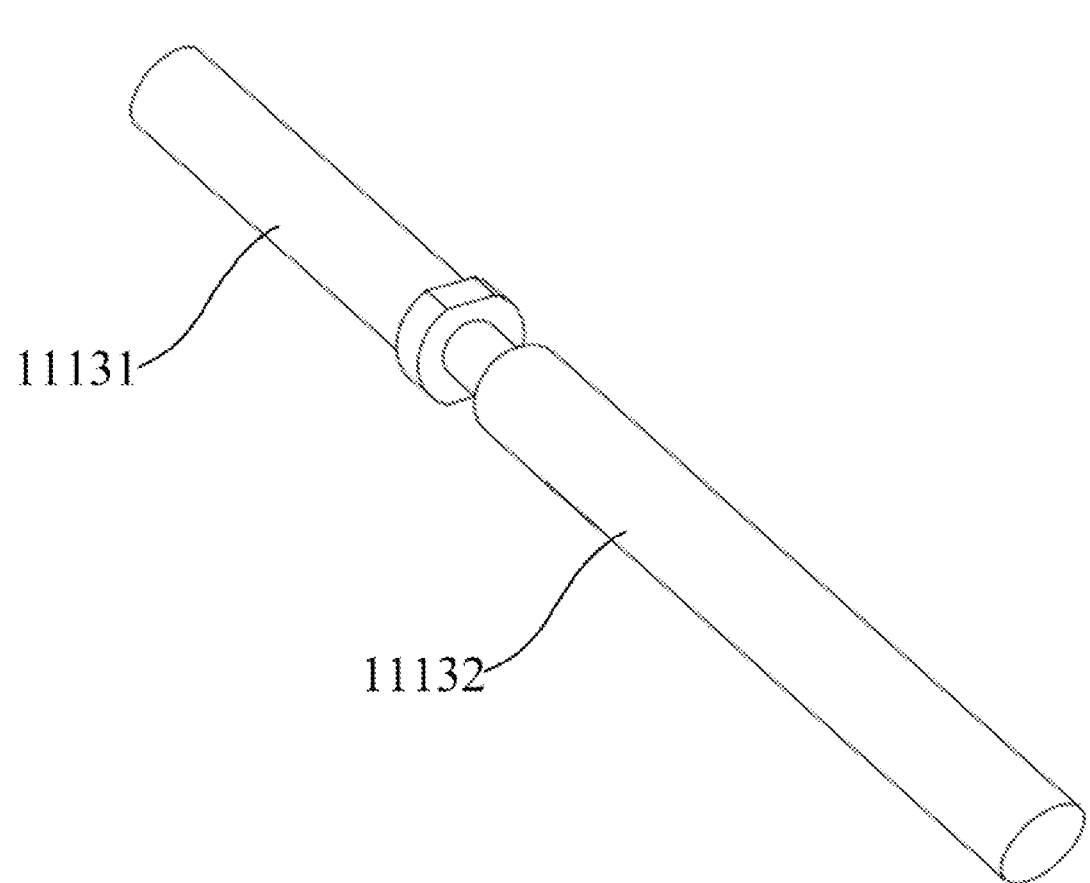
FIG. 11 is a schematic structural view of a support rod of a base in a flow test tool shown in FIG. 2.

In other words, the support rod 1113 can be extended or shortened along the height direction of the flow test tool 110. Specifically, referring to FIG. 2, FIG. 4 and FIG. 11, the support rod 1113 includes a first rod segment 11131 and a second rod segment 11132, one end of the first rod segment 11131 is connected to the first seat body 1111, one end of the second rod segment 11132 is connected to the first sliding rail 1112, and the other end of the first rod segment 11131 is telescopically connected to the other end of the second rod segment 11132.

There are multiple modes of telescopic connection between the first rod segment 11131 and the second rod segment 11132. For example, one end of the first rod segment 11131 close to the second rod segment 11132 is provided with a threaded part, one end of the second rod segment 11132 close to the first rod segment 11131 is provided with a threaded hole, the threaded part is in threaded connection in the threaded hole, and the first rod segment 11131 or the second rod segment 11132 can be screwed to extend or shorten the support rod 1113. For another example, one end of the second rod segment 11132 close to the first rod segment 11131 is provided with a gas pressure cavity, one end of the first rod segment 11131 close to the second rod segment 11132 is in sealed connection in the gas pressure cavity, and different pressures may be applied to the first rod segment 11131 or the second rod segment 11132 to extend or shorten the support rod 1113.

By adopting the above technical solution, the height of the flow test tool 110 can be adjusted according to the driving strokes of different driving mechanisms, and then, the flow test tool 110 can work in cooperation with more types of driving mechanisms, thereby effectively improving the universality of the flow test tool 110.

In some embodiments of the present application, referring to FIG. 2, the flow test tool 110 further includes a controller 115 electrically connected to a host computer 140, and the flow test module 112 is electrically connected to the controller 115.

The controller 115 is an electronic component for receiving flow data obtained by the flow test module 112 and transmitting the flow data to the host computer 140. The controller 115 may be electrically connected to the host computer 140 through a data cable to achieve data interaction between the controller 115 and the host computer 140. The controller 115 may also conduct data interaction with the host computer 140 in a mode of wireless communication. For example, both the controller 115 and the host computer 140 are provided with a wireless communication module, and a wireless communication path is established between the wireless communication module of the controller 115 and the wireless communication module of the host computer 140, so as to achieve data interaction between the controller 115 and the host computer 140. In a similar way, the controller 115 may be electrically connected to the flow test module 112 through a data cable to achieve data interaction between the controller 115 and the flow test module 112. The controller 115 may also conduct data interaction with the flow test module 112 in a mode of wireless communication. For example, both the controller 115 and the flow test module 112 are provided with a wireless communication module, and a wireless communication path is established between the wireless communication module of the controller 115 and the wireless communication module of the flow test module 112, so as to achieve data interaction between the controller 115 and the flow test module 112. The controller 115 includes, but is not limited to, a programmable logic controller (PLC) 115, a central processing unit (CPU), or the like, which is not specifically limited herein.

By adopting the above technical solution, the flow data measured by the flow test module 112 can be transmitted to the host computer 140 in real time through the controller 115, so as to collect test data.

According to the second aspect, an embodiment of the present application further provides a negative pressure formation apparatus 100. Referring to FIG. 1, the negative pressure formation apparatus 100 includes a formation mechanism 120 and a flow test tool 110 according to any one of the above embodiments. The formation mechanism 120 is provided with a plurality of fluid channels 121, and the test interface is connected to the fluid channel 121 one by one.

The formation mechanism 120 is a mechanism for performing formation processing on a battery, wherein the fluid channel 121 of the formation mechanism 120 is connected to the inside of the battery one by one to extract the gas inside the battery. The negative pressure formation apparatus 100 may further include a gas extracting mechanism 150, and the gas extracting end of the gas extracting mechanism 150 is communicated with each fluid channel 121 of the formation mechanism 120. Specifically, the formation mechanism 120 is further provided with a convergence channel 122, each fluid channel 121 is communicated with the convergence channel 122, and the gas extracting end of the gas extracting mechanism 150 is communicated with the convergence channel 122. During a flow test on the fluid channel 121, the test interface of the flow test module 112 is connected to the fluid channel 121 one by one, then, the gas extracting mechanism 150 is started to form a negative pressure in the fluid channel 121, and the gas enters the fluid channel 121 through the flow test module 112 to enable the flow test module 112 to obtain the flow data of each fluid channel 121. The negative pressure formation apparatus 100 may further include a host computer 140, and the host computer 140 is electrically connected to the controller 115 of the flow test tool 110. The flow test module 112 transmits the flow data to the controller 115, then, the controller 115 transmits the flow data to the host computer 140, and the host computer 140 analyzes and processes the flow data to determine whether each fluid channel 121 is blocked according to analysis results.

Since the negative pressure formation apparatus 100 provided in the embodiment of the present application uses the flow test tool 110 according to any one of the above embodiments, before formation processing on batteries, the flow test tool 110 can be used to conduct flow tests on each fluid channel 121 of the formation mechanism 120. During the flow test, the flow resistance of the gas in each fluid channel 121 is roughly the same to ensure that flow tests can be conducted on each fluid channel 121 of the formation mechanism 120 at the same time and in the same or similar test environment, thereby effectively improving the accuracy of flow tests on each fluid channel 121 of the formation mechanism 120 by the flow test tool 110.

In some embodiments of the present application, referring to FIG. 1, the negative pressure formation apparatus 100 further includes a lifting mechanism 130, and the lifting mechanism 130 is configured to drive the flow test tool 110 to move towards the direction close to the formation mechanism 120, so as to enable the test interface to be connected to the fluid channel 121 one by one.

The lifting mechanism 130 is a power mechanism for driving the flow test tool 110 to move to enable the flow test tool 110 to be connected to the formation mechanism 120. The driving direction of the lifting mechanism 130 is the height direction of the flow test tool 110. In other words, the formation mechanism 120 is arranged on one side of the flow test tool 110 along the height direction of the flow test tool 110, and the lifting mechanism 130 is arranged on the other side of the flow test tool 110 along the height direction of the flow test tool 110.

By adopting the above technical solution, the automatic connection between the test interface of the flow test tool 110 and the fluid channel 121 of the formation mechanism 120 can be realized, the manpower is saved, and the convenience of use of the negative pressure formation apparatus 100 is effectively improved.

In some embodiments of the present application, referring to FIG. 1, the lifting mechanism 130 includes a lifting seat 131 and a driver 132, the base 111 is arranged on the lifting seat 131, and the driver 132 is configured to drive the lifting seat 131 to move towards the direction close to the formation mechanism 120, so as to enable the test interface to be connected to the fluid channel 121 one by one.

The lifting seat 131 is a support component for supporting the flow test tool 110. The driver 132 is a power source of the lifting mechanism 130, which is configured to provide power for the lifting seat 131 to move away from or close to the formation mechanism 120. It can be understood that the power output end of the driver 132 is connected to the lifting seat 131. The driver 132 is a linear driver, and the linear driver includes, but is not limited to, an electric pneumatic cylinder, an electric hydraulic cylinder, a gear rack driver, a ball screw driver, or the like, which is not specifically limited herein.

By adopting the above technical solution, the automatic connection between the test interface of the flow test tool 110 and the fluid channel 121 of the formation mechanism 120 can be realized, the manpower is saved, and the convenience of use of the negative pressure formation apparatus 100 is effectively improved.

In some embodiments of the present application, referring to FIG. 1, the lifting seat 131 is provided with a first conductive element 1313 electrically connected to a power source, the base 111 is provided with a second conductive element 1114 electrically connected to the flow test module 112, and the second conductive element 1114 is capable of abutting against the first conductive element 1313 after the base 111 is placed on the lifting seat 131.

Both the first conductive element 1313 and the second conductive element 1114 are made of a conductive material, and the conductive material includes, but is not limited to, copper, tin, aluminum, conductive plastic, conductive rubber, or the like, which is not specifically limited. There are multiple structural forms of the first conductive element 1313 and the second conductive element 1114. For example, both the first conductive element 1313 and the second conductive element 1114 have a sheet structure. For another example, both the first conductive element 1313 and the second conductive element 1114 have a columnar structure. In this embodiment, both the first conductive element 1313 and the second conductive element 1114 have a sheet structure. Specifically, in order to ensure close contact between the first conductive element 1313 and the second conductive element 1114, both the first conductive element 1313 and the second conductive element 1114 are conductive leaf springs.

The arrangement positions of the first conductive element 1313 and the second conductive element 1114 can be determined according to actual design needs. For example, the first conductive element 1313 is arranged on a support surface of the lifting seat 131, and the second conductive element 1114 is arranged at the bottom of the base 111. For another example, the first conductive element 1313 is arranged on a side wall of the lifting seat 131, and the second conductive element 1114 is arranged on an outer side surface of the base 111. The arrangement positions are not specifically limited herein.

By adopting the above technical solution, after the base 111 is placed on the lifting seat 131, the first conductive element 1313 abuts against the second conductive element 1114, that is, the flow test tool 110 can be electrified without the additional electrifying operation on the flow test tool 110, thereby further improving the convenience of use of the negative pressure formation apparatus 100.

In some embodiments of the present application, the lifting seat 131 includes a second seat body 1311 and a positioning seat 1312 mounted on the second seat body 1311, the second seat body 1311 is connected to the power output end of the driver 132, and the base 111 is arranged on the positioning seat 1312.

The second seat body 1311 refers to a main support component of the lifting seat 131. The second seat body 1311 is made of a rigid material, and the rigid material includes, but is not limited to, aluminum, copper, iron, steel, plastic, or the like, which is not specifically limited herein.

The positioning seat 1312 is a component for limiting the position of the flow test tool 110. The positioning seat 1312 and the second seat body 1311 may be integrally formed, or the positioning seat 1312 and the second seat body 1311 may also be independently formed respectively, and then, the positioning seat 1312 and the second seat body 1311 are assembled.

By adopting the above technical solution, the position of the flow test tool 110 is effectively limited to prevent the displacement of the flow test tool 110 during the movement of the flow test tool 110 driven by the lifting mechanism 130, thereby ensuring that the flow test tool 110 can be accurately connected to the formation mechanism 120.

In some embodiments of the present application, referring to FIG. 1, the base 111 is provided with positioning holes 11111, the positioning seat 1312 is provided with positioning parts 13121, and the positioning parts 13121 are inserted into the positioning holes 11111.

The positioning part 13121 protrudes from the support surface of the lifting seat 131 along the height direction of the flow test tool 110 (that is, the Z direction shown in FIG. 1), and correspondingly, the positioning hole 11111 is recessed at the bottom of the base 111 along the height direction of the flow test tool 110. The outer diameter of the positioning part 13121 is roughly the same as the pore size of the positioning hole 11111. After the positioning part 13121 is inserted into the positioning hole 11111, the outer peripheral wall of the positioning part 13121 adheres to the hole wall of the positioning hole 11111 to limit the relative position between the base 111 and the positioning seat 1312, thereby limiting the position of the flow test tool 110. Of course, due to the manufacturing tolerance, there may be a certain gap between the outer peripheral wall of the positioning part 13121 and the hole wall of the positioning hole 11111.

In some other embodiments of the present application, the base 111 is provided with positioning parts 13121, the positioning seat 1312 is provided with positioning holes 11111, and the positioning parts 13121 are inserted into the positioning holes 11111.

The positioning part 13121 protrudes from the bottom of the base 111 along the height direction of the flow test tool 110 (that is, the Z direction shown in FIG. 1), and correspondingly, the positioning hole 11111 is recessed on the support surface of the lifting seat 131 along the height direction of the flow test tool 110.

By adopting the above technical solution, under the cooperation between the positioning parts 13121 and the positioning holes 11111, the position of the flow test tool 110 is effectively limited to prevent the displacement of the flow test tool 110 during the movement of the flow test tool 110 driven by the lifting mechanism 130, thereby ensuring that the flow test tool 110 can be accurately connected to the formation mechanism 120.

According to the third aspect, an embodiment of the present application further provides a battery manufacturing device. The battery manufacturing device includes a negative pressure formation apparatus 100 according to any one of the above embodiments.

Since the present application uses the negative pressure formation apparatus 100 according to any one of the above embodiments, before formation processing on batteries, the flow test tool 110 can be used to conduct flow tests on each fluid channel 121 of the formation mechanism 120. During the flow test, the flow resistance of the gas in each fluid channel 121 is roughly the same to ensure that flow tests can be conducted on each fluid channel 121 of the formation mechanism 120 at the same time and in the same or similar test environment, thereby effectively improving the accuracy of flow tests on each fluid channel 121 of the formation mechanism 120 by the flow test tool 110.

The above descriptions are merely preferred embodiments of the present application, and are not intended to limit the present application. Any modifications, equivalent replacements, improvements, and the like made within the spirit and principle of the present application shall be included within the protection scope of the present application.

The invention claimed is:

1. A flow test tool, wherein the flow test tool comprises:
   a base,
   a flow test module mounted on the base, and
   adapter assemblies,
   wherein the flow test module is provided with a plurality of test interfaces, and the test interface is connected to a fluid channel of a mechanism to be tested one by one,
   the adapter assembly comprises an adapter mounted on the base, the adapter is provided with a plurality of adapter channels, one open end of the adapter channel is connected to the test interface one by one, and the other open end of the adapter channel is connected to the fluid channel one by one,
   the base comprises:
      a first seat body,
      a first sliding rail arranged on the first seat body, and
      support rods,
         wherein the flow test module is mounted on the first seat body, and the adapter is slidably mounted on the first sliding rail, the support rods are connected between the first seat body and the first sliding rail.

2. The flow test tool according to claim 1, wherein the flow test tool further comprises a plurality of connecting pipes, the adapter is provided with a first sleeve at the open end of the adapter channel close to the test interface, the flow test module is provided with a second sleeve at the test interface, one end of the connecting pipe is sleeved with the first sleeve, and the other end of the connecting pipe is sleeved with the second sleeve.

3. The flow test tool according to claim 1, wherein the adapter assembly further comprises a plurality of sealing members, one end of the sealing member is in sealed connection with the open end of the adapter channel close to the fluid channel one by one, and the other end of the sealing member is in sealed connection with the open end of the fluid channel close to the adapter one by one.

4. The flow test tool according to claim 3, wherein the adapter is provided with a third sleeve at the open end of the adapter channel close to the fluid channel, and the sealing member has an annular structure and is sleeved with the third sleeve.

5. The flow test tool according to claim 3, wherein the adapter is provided with a first annular groove at an outer peripheral edge of the open end of the adapter channel close to the fluid channel, and the sealing member has an annular structure and is inserted into the first annular groove.

6. The flow test tool according to claim 3, wherein a sealing member abuts against an outer peripheral edge of the open end of the fluid channel close to the adapter.

7. The flow test tool according to claim 1, wherein the base further comprises a second sliding rail arranged on the first seat body, the flow test module is slidably mounted on the second sliding rail, and the second sliding rail and the first sliding rail are arranged in parallel.

8. The flow test tool according to claim 1, wherein the support rod is a telescopic rod.

9. The flow test tool according to claim 1, wherein the flow test tool further comprises a controller electrically connected to a host computer, and the flow test module is electrically connected to the controller.

10. A negative pressure formation apparatus, wherein the negative pressure formation apparatus comprises a formation mechanism and the flow test tool according to claim 1, the formation mechanism is provided with a plurality of fluid channels, and the test interface is connected to the fluid channel one by one.

11. The negative pressure formation apparatus according to claim 10, wherein the negative pressure formation apparatus further comprises a lifting mechanism, and the lifting mechanism is configured to drive the flow test tool to move towards a direction close to the formation mechanism, so as to enable the test interface to be connected to the fluid channel one by one.

12. The negative pressure formation apparatus according to claim 11, wherein the lifting mechanism comprises a lifting seat and a driver, the base is arranged on the lifting seat, and the driver is configured to drive the lifting seat to move towards a direction close to the formation mechanism to enable the test interface to be connected to the fluid channel one by one.

13. The negative pressure formation apparatus according to claim 12, wherein the lifting seat is provided with a first conductive element electrically connected to a power source, the base is provided with a second conductive element electrically connected to the flow test module, and the second conductive element is capable of abutting against the first conductive element after the base is placed on the lifting seat.

14. The negative pressure formation apparatus according to claim 13, wherein the first conductive element and/or the second conductive element are conductive leaf springs.

15. The negative pressure formation apparatus according to claim 12, wherein the lifting seat comprises a second seat body and a positioning seat mounted on the second seat body, the second seat body is connected to a power output end of the driver, and the base is arranged on the positioning seat.

16. The negative pressure formation apparatus according to claim 15, wherein the base is provided with positioning holes, and the positioning seat is provided with positioning parts; or the base is provided with positioning parts, and the positioning seat is provided with positioning holes; and the positioning parts are inserted into the positioning holes.

17. A battery manufacturing device, comprising the negative pressure formation apparatus according to claim 13.

18. A flow test tool, wherein the flow test tool comprises:

a base, a flow test module mounted on the base, and adapter assemblies, wherein the flow test module is provided with a plurality of test interfaces, and the test interface is connected to a fluid channel of a mechanism to be tested one by one, the adapter assembly comprises:

an adapter mounted on the base, and a plurality of sealing members, wherein the adapter is provided with a plurality of adapter channels, one open end of the adapter channel is connected to the test interface one by one, and the other open end of the adapter channel is connected to the fluid channel one by one, one end of each of the sealing members is in sealed connection with the open end of the adapter channel close to the fluid channel one by one, and the other end of each of the sealing members is in sealed connection with the open end of the fluid channel close to the adapter one by one, and the adapter is provided with a first annular groove at an outer peripheral edge of the open end of the adapter channel close to the fluid channel, and the sealing member has an annular structure and is inserted into the first annular groove.

19. The flow test tool according to claim 18, wherein the flow test tool further comprises a plurality of connecting pipes, the adapter is provided with a first sleeve at the open end of the adapter channel close to the test interface, the flow test module is provided with a second sleeve at the test interface, one end of the connecting pipe is sleeved with the first sleeve, and the other end of the connecting pipe is sleeved with the second sleeve.

20. The flow test tool according to claim 18, wherein the adapter is provided with a third sleeve at the open end of the adapter channel close to the fluid channel, and the sealing member has an annular structure and is sleeved with the third sleeve.

\* \* \* \* \*